(12) United States Patent
Aggarwal et al.

(10) Patent No.: US 12,242,994 B1
(45) Date of Patent: Mar. 4, 2025

(54) TECHNIQUES FOR AUTOMATIC GENERATION OF REPORTS BASED ON ORGANIZATIONAL DATA

(71) Applicant: People Center, Inc., San Francisco, CA (US)

(72) Inventors: Nikunj Aggarwal, Secaucus, NJ (US); Suraj Hasmukhlal Savalia, San Francisco, CA (US); Spencer Christian Butterfield, Orem, UT (US); Robert Bolling Lambeth, III, New York, NY (US); Naman Kumar Agarwal, Bengaluru (IN); Ayush Rai, Madhya Pradesh (IN); Parikshith Ramesh Kalariya, Gujarat (IN); Abhishek Gupta, Haryana (IN); Leonardo Antonoff Araujo, Vancouver (CA)

(73) Assignee: People Center, Inc., San Francisco, CA (US)

( * ) Notice: Subject to any disclaimer, the term of this patent is extended or adjusted under 35 U.S.C. 154(b) by 0 days.

(21) Appl. No.: 18/650,886

(22) Filed: Apr. 30, 2024

(51) Int. Cl.
*G06Q 10/0633* (2023.01)

(52) U.S. Cl.
CPC .............................. *G06Q 10/0633* (2013.01)

(58) Field of Classification Search
CPC .......................................... G06Q 10/00–50/00
USPC ................................................ 705/7.11–7.42
See application file for complete search history.

(56) References Cited

U.S. PATENT DOCUMENTS

| | | | |
|---|---|---|---|
| 8,244,714 B1* | 8/2012 | Collins | G06F 16/2457 707/766 |
| 10,324,951 B1* | 6/2019 | Miller | G06F 16/219 |
| 10,489,405 B2* | 11/2019 | Zheng | G06F 16/284 |
| 11,687,827 B2* | 6/2023 | Pondicherry Murugappan | G06Q 10/10 706/11 |
| 11,989,507 B2* | 5/2024 | Tunstall-Pedoe | G06F 16/3344 |

(Continued)

OTHER PUBLICATIONS

Wikipedia, Hallucination (artificial intelligence), https://en.wikipedia.org/wiki/Hallucination_(artificial_intelligence) (Year: 2024).*

(Continued)

*Primary Examiner* — Alan S Miller
(74) *Attorney, Agent, or Firm* — Dority & Manning, P.A.

(57) ABSTRACT

Techniques for automatically generating reports based on organizational data. For example, a computer system can include a database of organizational data associated with the organization. The organizational data includes a plurality of employee data objects and a plurality of previously generated report configuration files. The system can include a machine-learned model configured to generate a report configuration file based on a prompt. The machine-learned model can be trained using the plurality of previously generated report configuration files. The system can receive a user query requesting a report associated with the organizational data. Additionally, the system can process, using a natural language processing model, the user query and the employee data objects to generate a prompt. Moreover, the system can process, by the machine-learned model, the prompt and the organizational data to generate a report configuration file. Furthermore, the system can generate the report based on the report configuration file.

18 Claims, 7 Drawing Sheets

(56) References Cited

U.S. PATENT DOCUMENTS

| | | | |
|---|---|---|---|
| 12,008,020 B2* | 6/2024 | Kiryakov | G06F 16/283 |
| 2010/0250566 A1* | 9/2010 | Paul | G06F 16/283 |
| | | | 707/756 |
| 2016/0103823 A1* | 4/2016 | Jackson, Jr. | G06N 5/025 |
| | | | 704/9 |
| 2016/0179897 A1* | 6/2016 | Zheng | G06F 16/289 |
| | | | 707/722 |
| 2020/0111023 A1* | 4/2020 | Pondicherry Murugappan | |
| | | | G06N 5/02 |
| 2021/0141831 A1* | 5/2021 | Sherman | C12C 11/06 |
| 2021/0149886 A1* | 5/2021 | Zheng | G06N 5/02 |
| 2021/0224250 A1* | 7/2021 | Griffith | G06F 16/25 |
| 2022/0083606 A1* | 3/2022 | Drost | G06F 16/93 |
| 2023/0004388 A1* | 1/2023 | Gunda | G06F 16/2448 |
| 2023/0023134 A1* | 1/2023 | Kiryakov | G06N 5/04 |
| 2023/0274084 A1* | 8/2023 | Modani | G06F 40/174 |
| | | | 715/243 |
| 2023/0274086 A1* | 8/2023 | Tunstall-Pedoe | G06F 40/20 |
| | | | 704/9 |
| 2024/0202221 A1* | 6/2024 | Siebel | G06F 16/345 |

OTHER PUBLICATIONS

Evdaimon et al., Neural Graph Generator: Feature-Conditioned Graph Generation using Latent Diffusion Models, arXiv:2403.01535v2, Apr. 23, 2024, 16 pages.

Zhu et al., "AutoChart: A Dataset for Chart-to-Text Generation Task", arXiv:2108.06897v1, Aug. 16, 2021, 9 pages.

\* cited by examiner

EXIT SURVEY BY DEPARTMENT

502 — WHAT ARE THE RESULTS TO OUR EXIT SURVEY, BY DEPARTMENT

506 — KEEP EDIT ×

| QUESTION | OVERALL | DESIGN | ENGINEERING | SALES | MARKETING |
|---|---|---|---|---|---|
| I ENJOYED WORKING HERE. | 62 | 70 | 19 | 90 | 62 |
| MY MANAGER WAS EFFECTIVE. | 69 | 80 | 75 | 39 | 58 |
| I WAS FAIRLY COMPENSATED | 80 | 76 | 59 | 38 | 74 |
| I RESPECTED BY COLLEAGUES | 50 | 60 | 75 | 15 | 95 |
| I WAS EQUIPPED FOR SUCCESS. | 40 | 19 | 55 | 24 | 61 |

504

500

UPDATE

TECHNIQUES FOR AUTOMATIC GENERATION OF REPORTS BASED ON ORGANIZATIONAL DATA

FIELD

The present disclosure generally relates to using machine-learned models to generate reports based on organizational data. More particularly, the present disclosure relates to training a large language model (LLM) using organizational data and using the LLM to process employee graph object data to generate customized reports based on a user request.

BACKGROUND

A large language model (LLM) is a type of artificial intelligence (AI) model that is trained on a large corpus of data to understand and generate content. The LLM can perform various natural language processing tasks such as text generation, text completion, language translation, sentiment analysis, content generation, and summarization. LLMs have demonstrated the ability to understand and generate content across diverse domains and contexts, making them powerful tools for automating language-related tasks and enhancing human-computer interaction.

It is important to note that while LLMs can assist in understanding and processing natural language requests, they may not be proficient in tasks such as data retrieval, processing, and visualization. Integration with other tools and databases specialized in these tasks may be necessary to build a complete system for generating content based on natural language requests.

SUMMARY

Aspects and advantages of embodiments of the present disclosure will be set forth in part in the following description, or can be learned from the description, or can be learned through practice of the embodiments.

One example aspect is directed to a computing system that automatically generates an output based on organizational data of an organization. The computer system can include one or more processors and one or more databases that collectively store the organizational data associated with the organization. The organizational data can include a plurality of employee data objects that respectively correspond to a plurality of employees of the organization, and a plurality of previously generated report configuration files. Additionally, the system can include a machine-learned model configured to generate a report configuration file based on a prompt. The machine-learned model can be trained using the plurality of previously generated report configuration files. Moreover, the one or more non-transitory computer-readable media that collectively store instructions that, when executed by the one or more processors, cause the computer system to perform operations. The operations can include receiving a user query requesting a report associated with the organizational data. Furthermore, the operations can include processing, using a natural language processing model, the user query and the employee data objects to generate a prompt. The operations can also include processing, by the machine-learned model, the prompt and the organizational data to generate a first report configuration file. Subsequently, the operations can include generating the report based on the first report configuration file.

In some implementations, the system can determine whether the first report configuration file is validated by comparing the first report configuration file with the plurality of previously generated report configuration files.

In some implementations, the system can process the first report configuration file to generate the report when determined that the first report configuration file is validated.

In some implementations, the system can determine that a parameter of the first report configuration file is incorrect based on the comparison of the first report configuration file with the plurality of previously generated report configuration files. Additionally, the system can update the parameter of the first report configuration file prior to the processing of the first report configuration file to generate the report.

In some implementations, the system can select, from a plurality of template configuration files, a second report configuration file to generate the report when determined that the first report configuration is not validated.

In some implementations, the plurality of template configuration files has been previously generated and stored in a database of the organizational management platform.

In some implementations, the first report configuration file has a parameter that is associated with an attribute of the employee data objects.

In some implementations, the report can be a chart. The system can determine the type of chart to generate based on the user query and/or report configuration file.

In some implementations, the system can present the report on a graphical user interface. Additionally, the system can receive user feedback in response to the presentation of the report. Moreover, the system can update the first report configuration file based on the user feedback. Furthermore, the system can present an updated report on the graphical user interface, the updated report being generated based on the updated first report configuration file.

In some implementations, the system can present the report on a graphical user interface. Additionally, the system can receive user feedback in response to the presentation of the report. Moreover, the system can update one or more parameters of the machine-learned model based on the user feedback.

Another example aspect is directed to a computer-implemented method automatically generating a report based on user query. The method can include storing organizational data associated with the organization. The organizational data can include a plurality of employee data objects that respectively correspond to a plurality of employees of an organization, and a plurality of previously generated report configuration files. Additionally, the method can include accessing a machine-learned model, wherein the machine-learned model is configured to generate a report configuration file based on a prompt. The machine-learned model can be trained using the plurality of previously generated report configuration files. Moreover, the method can include receiving a user query requesting a report associated with the organizational data. Furthermore, the method can include processing, using a natural language processing model, the user query and the employee data objects to generate a prompt. The method can include processing, by the machine-learned model, the prompt and the organizational data to generate a first report configuration file. Subsequently, the method can include generating the report based on the first report configuration file.

Yet another example aspect is directed to one or more non-transitory computer-readable media that collectively store instructions that, when executed by one or more processors, cause a computing system to perform actions.

The actions can include storing organizational data associated with the organization. The organizational data can include a plurality of employee data objects that respectively correspond to a plurality of employees of an organization, and a plurality of previously generated report configuration files. Additionally, the actions can include accessing a machine-learned model, wherein the machine-learned model is configured to generate a report configuration file based on a prompt. The machine-learned model can be trained using the plurality of previously generated report configuration files. Moreover, the actions can include receiving a user query requesting a report associated with the organizational data. Furthermore, the actions can include processing, using a natural language processing model, the user query and the employee data objects to generate a prompt. The actions can further include processing, by the machine-learned model, the prompt and the organizational data to generate a first report configuration file. Subsequently, the actions can include generating the report based on the first report configuration file.

Other aspects of the present disclosure are directed to various systems, apparatuses, non-transitory computer-readable media, user interfaces, and devices for providing multilayered generation and processing of computer instructions. These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIG. 5 illustrates an illustration of an AI-generated table based on a user query according to example embodiments of the present disclosure.

FIG. 7 illustrates an illustration of a graphical user interface with a plurality of AI-generated reports according to example embodiments of the present disclosure.

Figure 1:
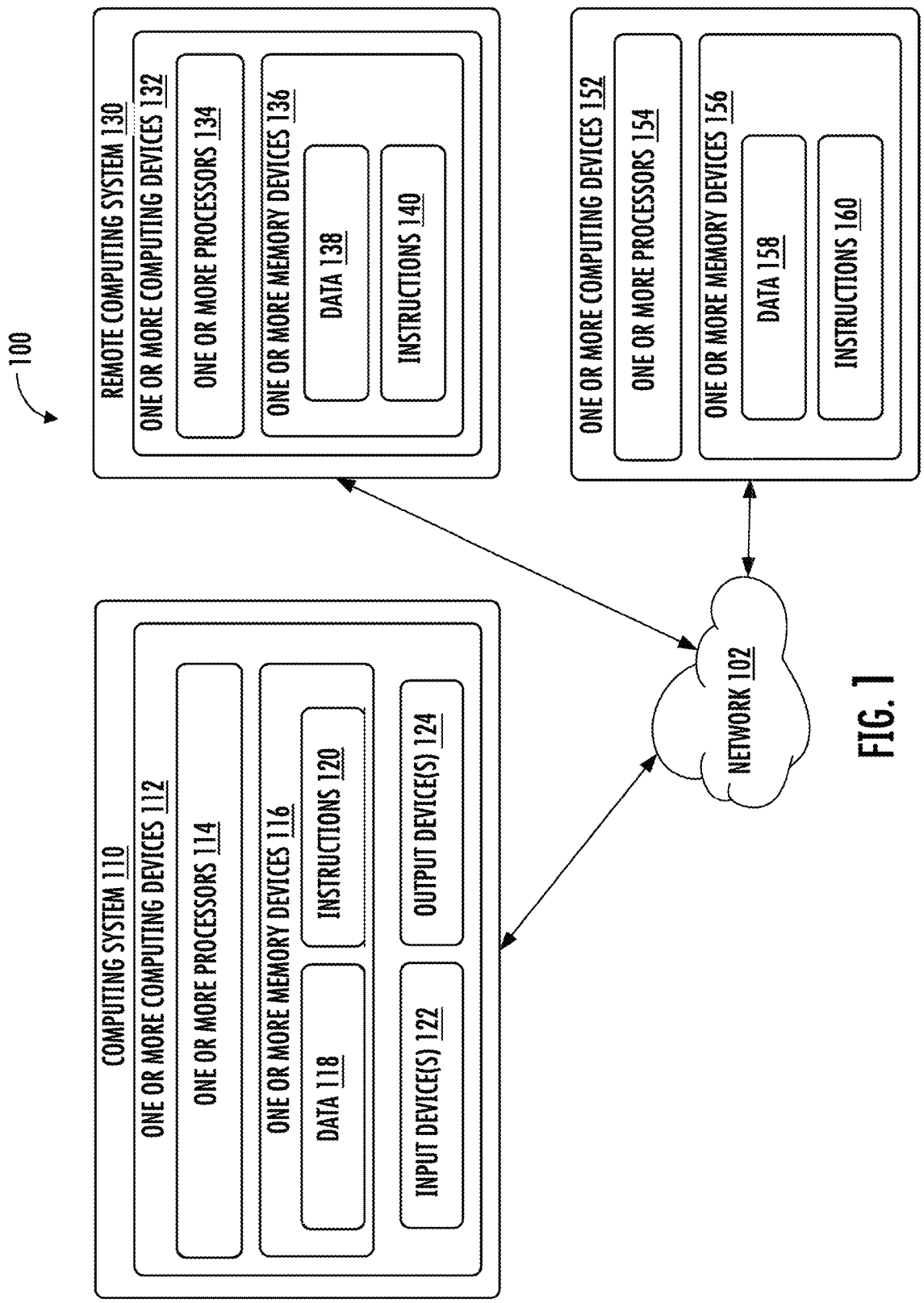
FIG. 1 depicts a block diagram of an example environment including a computing system that performs operations, according to example embodiments of the present disclosure.

Reference numerals that are repeated across plural figures are intended to identify the same features in various implementations.

DETAILED DESCRIPTION

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a further embodiment. Thus, it is intended that aspects of the present disclosure cover such modifications and variations.

Generally, the present disclosure is directed to providing improved computer applications, computer systems, computer-implemented methods, user interfaces, and/or services for using machine-learned models to generate reports. In particular, examples described in the present disclosure enable automated generation of reports by processing organizational data of an organization.

The present disclosure provides examples of creating AI-generated reports. In examples of the present disclosure, a computer system may generate and process computer instructions, for example, based on receiving a user request to create the AI-generated reports. The system can automatically generate reports using machine-learned models (e.g., large language models (LLMs)). For example, the system can include a natural language interface for report generation, where users can input a user query using text and/or speech. The system can generate reports (e.g., graphs, tables, other information) based on the user query. The reports can be generated by processing and analyzing the organization data of an organization.

According to some embodiments, the system can generate a report based on a user request by using a machine-learned model to process the organizational data. The system can perform natural language processing techniques to understand the user request. The system can extract key information such as a type of report requested, output data to be visualized, input data to be processed, a desired format for the report, and any specific parameters or filters. The system can include a natural language interface for report generation. The system can use a natural language interface for users to input their queries. Users can input text or speech, which is interpreted by the system and used to output data graphs, tables, and other information. The ability to input queries in natural language simplifies the user experience significantly. The system can generate a prompt for the machine-learned model based on the user input.

In some instances, the system can be part of an organization management platform. The organizational management platform can hold, for each of one or more organizations, a centralized set of organizational data that acts as a single, centralized system of record for all organizational management processes for that organization. Each organization can include a number of users who are able to access and interact with the organizational management platform. Some users may have administrative permissions which define whether the user is able to access and/or modify certain types of organizational data for their organization. The AI-generated reports can be generated for a user based on the specific access of the user.

For example, an organization can generally use many applications and systems to sustain operations. Such applications and systems can be integrated with organizational data of the organization that is managed by the organizational management platform as the centralized system of record. In addition, such applications and systems can process the organizational data and usually are written by computer programmers in complex programming languages, utilize sophisticated data models with large numbers of entities and relationships. However, most users that work with organizational data lack the specialized knowledge, experience, and skills to build and maintain applications and systems that utilize organizational data. As such, organizations can benefit from improved systems that empower users with the ability to access, query, obtain, and perform various operations with organizational data and other types of information available in an organizational management platform.

The organizational data for each organization can include data directly entered into the organizational management platform and/or can include data retrieved, pulled, or otherwise obtained from one or more first party and/or third-party applications with which the organizational management platform may have varying levels of integration. This ingestion and storage of data from third-party applications is in contrast to systems which simply sit on top of third-party applications and apply rules at run time. In some implementations, the organizational management platform can provide a user with the ability to configure the cadence or periodicity at which the organizational management platform receives or ingests data from third-party applications. Data can be transferred between the organizational management platform and third-party applications using various techniques such as application programming interfaces, data hooks, flat files, bulk uploads/downloads and/or other data transfer mechanisms.

The organizational data can, in some implementations, include object graph data. For example, the object graph data of an object can be stored in an object database. Example object classes for the object graph can include employees, devices, job candidates, benefits policies, documents, pay instances, timecards, access rights and/or other objects. For each object, values can be provided and maintained for one or more attributes, such as location, role, salary, and so on. Links can be made between different objects. The object database can be represented as or can store object graph data which can be represented as one or more graphs with nodes that correspond to objects and edges that correspond to links or logical associations between objects and/or object attributes. Graphs can be traversed to understand or leverage relationships among objects and their attributes. In one example, the organizational data can be synthesized into a single graph which includes multiple classes of objects and defines complex relationships among objects and their attributes. For example, all workflows, including payroll, IT, and other workflows can be run through one platform and graph. In some implementations, the employee objects can be referred to and/or treated as sentinel nodes.

According to some embodiments, the system can retrieve the organizational data to be processed to generate the report. The organizational data can be stored in a database of the organizational management platform. In some instances, the system can query the database based on the parameters extracted and/or generated from the user request. Moreover, the system can analyze and process the retrieved data for visualization. For example, the system can clean the data, aggregating the data, performing calculations, and/or applying statistical analysis as needed. Subsequently the system can generate the report. In some instances, the report can include a chart. The chart can be generated using charting libraries to generate the desired chart based on the processed data. The type of chart generated can be based on the user request, and the type of the data being visualized. Common types of charts include bar charts, line charts, pie charts, scatter plots.

In some instances, after generating the report, the system can formulate a natural language response to the user that includes the chart itself along with any relevant insights or explanations. This response is generated in a way that is understandable and informative to the user.

In some instances, the system can include a user feedback loop. The system can update the AI-generated report based on the user feedback. Additionally, the machine-learned models can be updated based on user feedback to the AI-generated reports. For example, one or more parameters of the machine-learned models can be modified based on the user feedback. By incorporating a process for feedback from the user, the system can improve the accuracy and relevance of future report generations. Additionally, the system can provide, using a graphical user interface, options for refining the generated chart based on the user feedback.

Moreover, the system can generate and improve a prompt that is inputted into the first LLM. For example, the prompt can be improved or enhanced based on context derived from object graph data of the organization. The organizational data can include the object graph data. The system can improve (e.g., enrich) the prompt given to the machine learning models using context from the object graph data. The object graph data can store and manage attributes (e.g., field metadata) for all the models in a platform. By improving the prompt for the first LLM, the system can produce better and more accurate results.

With regards to training or fine-tuning the LLM, in some instances, the system can utilize a first LLM to generate a report based on a user query and utilize a second LLM to fine-tune the first LLM. The second LLM can be smaller in size (e.g., less parameters) than the first LLM, resulting in faster and cheaper training and inference. For example, the system can fine-tune the machine-learned models (e.g., first LLM) by using historical report configurations that have been previously generated for a plurality of organization. For example, the organizational management platform can maintain organizational data for a plurality of organization, such as previously generated report configuration files. The system can utilize previously generated report configuration files to generate report templates and to fine-tune one or more machine-learned models. In some instances, the system can utilize a first LLM to generate a report based on a user query and utilize a second LLM to generate a plurality of user queries based on previously generated report configuration files. The second LLM can generate a plurality of user queries based on previously generated report configuration files. The generated user queries and the corresponding report configuration files can be utilized to fine-tune the first LLM.

In some instances, when the report configuration file generated by the first LLM is not validated, the system can generate reports based on template reports. In some instances, when the LLM generates a report configuration that is not validated (e.g., validation score below a threshold), the system can determine a template report based on the received user input. Subsequently, the report can be generated based on the determined template report. This enables the system to provide users with a report that is accurate even when the report configuration file generated by the first LLM is not validated.

In some instances, the system can prevent hallucinations. For example, the system can perform a correction of hallucinated chart types and attributes. The system can have a mechanism to correct hallucinated chart types and attributes. In some instances, based on a comparison with the previously generated report configuration file, the system can determine to update one or more parameters of the AI-generated report configuration file. For example, the system can return the string closest to a given input from a list of string choices in the system.

According to some embodiments, the system includes a data visualization and reporting dashboard. The system has a dashboard where individual queries can be combined to create a comprehensive view containing different reports that have been generated. Additionally, the user interface provides a consolidated view of the data queries of the user. Moreover, the system can include a feature to watermark content that is AI-generated, to help distinguish between human-generated and AI generated content. In other examples, the user request can generate predefined reports, policies, triggering, data management, and/or workflows. These predefined items can be visible and modifiable by the user (e.g., in raw query expression form or via a wizard user interface). For example, in the wizard user interface, objects or functions can be automatically populated and/or suggested.

The systems, methods, and computer program products described herein provide a number of technical effects and benefits. As one example, the embodiments described in the present disclosure provide automated generation and processing of computer instructions for use across a variety of applications and systems that utilize different underlying technologies and technical designs, for example, more efficiently and with fewer computing resources (e.g., less processing power, less memory usage, less power consumption), that would otherwise be wasted by maintaining custom, proprietary, and/or manual processes. In particular, examples of the present disclosure automate the generation and processing of computer instructions across different applications and systems using a rigorous computerized process.

With reference to the Figures, example embodiments of the present disclosure will be discussed in further detail.

FIG. 1 depicts a block diagram of an example environment 100 including a computing system 110 that performs operations according to example embodiments of the present disclosure. The environment 100 includes a network 102, a computing system 110, one or more computing devices 112, one or more processors 114, one or more memory devices 116, data 118, instructions 120, a remote computing system 130, one or more computing devices 132, one or more processors 134, one or more memory devices 136, data 138, instructions 140, one or more computing devices 152, one or more processors 154, one or more memory devices 156, data 158, and instructions 160.

The network 102 can include any type of communications network. For example, the network 102 can include a local area network (LAN), a wide area network (WAN), an intranet, an extranet, and/or the internet. Further, the network 102 can include any number of wired or wireless connections and/or links that can be used to communicate with one or more computing systems (e.g., the computing system 110 and/or the remote computing system 130) and/or one or more devices (e.g., the one or more computing devices 152). Communication over the network 102 can be performed via any type of wired and/or wireless connection and can use a wide variety of communication protocols (e.g., TCP/IP, HTTP, SMTP, FTP), encodings or formats (e.g., HTML, XML), and/or protection schemes (e.g., VPN, secure HTTP, SSL).

The computing system 110 can include any combination of systems and/or devices including one or more computing systems (not shown) and/or one or more computing devices 112. Further, the computing system 110 may be connected (e.g., networked) to one or more computing systems (e.g., remote computing system 130) and/or one or more computing devices (e.g., one or more computing devices 132, 152) via the network 102. The computing system 110 may operate in various different configurations including as a server or a client machine in a client-server network environment, or as a peer machine in a peer-to-peer (or distributed) network environment. Though the computing system 110 is depicted in FIG. 1 as a single device, the computing system 110 can include any collection or combination of devices that individually or in combination with other devices, execute a set of one or more instructions to perform any one or more of the operations discussed herein.

In this example, the computing system 110 includes one or more computing devices 112. The one or more computing devices 112 can include any type of computing device. For example, the one or more computing devices 112 can include a personal computing device (e.g., a desktop computing device), a mobile computing device (e.g., a smartphone or tablet device), a wearable computing device (e.g., a smartwatch device), an embedded computing device, a web appliance, a server computing device, a network router, a switch, a bridge, or any device capable of executing a set of instructions (e.g., any combination of instructions which can include sequential instructions and/or parallel instructions) associated with one or more operations and/or one or more actions to be performed by the computing system 110 or any of the constituent components and/or devices of the computing system 110.

Any of the one or more computing devices 112 can include the one or more processors 114. The one or more processors 114 can include any processing device (e.g., a processor core, a microprocessor, an ASIC, a FPGA, a controller, or a microcontroller) and can include one processor or multiple processors that may be operatively connected. In some embodiments, the one or more processors 114 may include one or more complex instruction set computing (CISC) microprocessors, one or more reduced instruction set computing (RISC) microprocessors, one or more very long instruction word (VLIW) microprocessors, and/or one or more processors that are configured to implement other instruction sets.

The one or more computing devices 112 can include the one or more memory devices 116. The one or more memory devices 116 can be used to store data and/or information and can include one or more computer-readable media, one or more non-transitory computer-readable storage media, and/or one or more machine-readable media. Though the one or more memory devices 116 are depicted in FIG. 1 as a single unit (e.g., a single medium), the computer-readable storage media can include a single medium or multiple media (e.g., a centralized or distributed database, and/or associated caches and servers) that store one or more sets of instructions. Further, the computer-readable storage media can include any medium that is capable of storing, encoding, and/or carrying a set of instructions for execution by a computing device and which may cause the computing device to perform any of the one or more operations described herein. In some embodiments, the computer-readable storage media can include one or more solid-state memories, one or more optical media, and/or one or more magnetic media. By way of example, the one or more memory devices 116 can include any combination of random-access memory (RAM), read-only memory (ROM), EEPROM, EPROM, one or more flash memory devices, and/or one or more magnetic storage devices (e.g., one or more hard disk drives).

The one or more processors 114 can be configured to execute one or more instructions to perform the operations described herein including, for example, one or more operations associated generating a report based on a user request. Further, the one or more memory devices 116 can store the data 118 and/or the instructions 120, which can be executed by the one or more processors 114 to cause the one or more computing devices 112 to perform one or more operations. For example, the one or more operations performed by the one or more processors 114 can include receiving a request to generate a report, process the request and organization data to generate a prompt, process the prompt to generate a first report configuration file, and generate the report based on the first report configuration file.

The data 118 can include organizational data (e.g., organizational data that can include one or more organizational records), one or more data structures defining, describing, and/or otherwise associated with the organizational data, rule data (e.g., one or more rules maintained by an organizational data management system), access rights data, application data (e.g., application data associated with a plurality of applications including one or more third-party applications and/or one or more intra-organizational applications), third-party integration data (e.g., data providing configuration and/or other information for performing integration and synchronization with each of one or more different third-party systems and/or applications), organizational policy data (e.g., organizational policy data associated with one or more organizational policies), application policy data (e.g., policy data that includes one or policies associated with the organizational data, the rule data, the application data, one or more applications, one or more devices), and/or other types of data. Further, the instructions 120 can include one or more instructions to use data including the data 118 to perform any one or more of the various operations described herein. In some embodiments, the one or more memory devices 116 can be used to store one or more applications that can be operated by the one or more processors 114. The data 118, the instructions 120, and/or the one or more applications can be associated with an organization.

Any of the one or more computing devices 112 can include one or more input devices 122 and/or one or more output devices 124. The one or more input devices 122 can be configured to receive input (e.g., user input) and can include one or more touch screens, one or more keyboards, one or more pointing devices, (e.g., mouse device), one or more buttons, one or more microphones, and/or one or more cameras. The one or more output devices 124 can include one or more display devices, one or more loudspeaker devices, one or more haptic output devices. By way of example, the one or more output devices 124 can be used to display a graphical user interface via a display device that can include a touch screen layer that is configured to detect one or more inputs (e.g., one or more user inputs). The one or more processors 114 may perform one or more operations (e.g., operations associated with performing multilayered generation and processing of computer instructions) based at least in part on the one or more inputs.

The remote computing system 130 includes one or more computing devices 132. Each of the one or more computing devices 132 can include one or more processors 134, one or more memory devices 136, the data 138, and/or the instructions 140. The remote computing system 130 can include any of the attributes and/or capabilities of the computing system 110. Further, the remote computing system 130 can communicate with one or more devices and/or one or more systems via the network 102.

In some embodiments, the remote computing system 130 can include one or more applications (e.g., computer software applications comprising computer instructions, machine-learned models) that can be stored and/or executed by the remote computing system 130. Further, the one or more applications can include one or more third-party applications that may be accessed from the computing system 110 and which are at least partly operated from the remote computing system 130. The one or more third-party applications generally may be associated with and provided by an organization that is different from the organization that is associated with the computing system 110. Further, the data 138 can include one or more portions of the organizational data (e.g., one or more organizational records), one or more data structures associated with the organizational data, rule data, organizational policy data, application policy data, third-party integration data, and/or other types of data.

Furthermore, the example environment can include one or more computing devices 152 (e.g., user devices or any other types of devices) having one or more processors 154, one or more memory devices 156, the data 158, and/or the instructions 160. Such one or more computing devices 152 may include any of the attributes and/or capabilities of the one or more computing devices 112, 132. Further, such one or more computing devices 152 can communicate with one or more devices and/or one or more systems via the network 102.

In some embodiments, the one or more computing devices 152 can include one or more applications (e.g., computer software applications comprising computer instructions, machine-learned models) that can be stored and/or executed by such one or more computing devices 152. Further, the one or more applications can include one or more third-party applications that may be accessed from the one or more computing devices 152 and which are at least partly operated from such one or more computing devices 152. Data 138 may include, for example, one or more portions of the organizational data (e.g., one or more organizational records), one or more data structures associated with the organizational data, rule data, organizational policy data, application policy data, third-party integration data (e.g., third-party application integration data), and/or other types of data.

Figure 2:
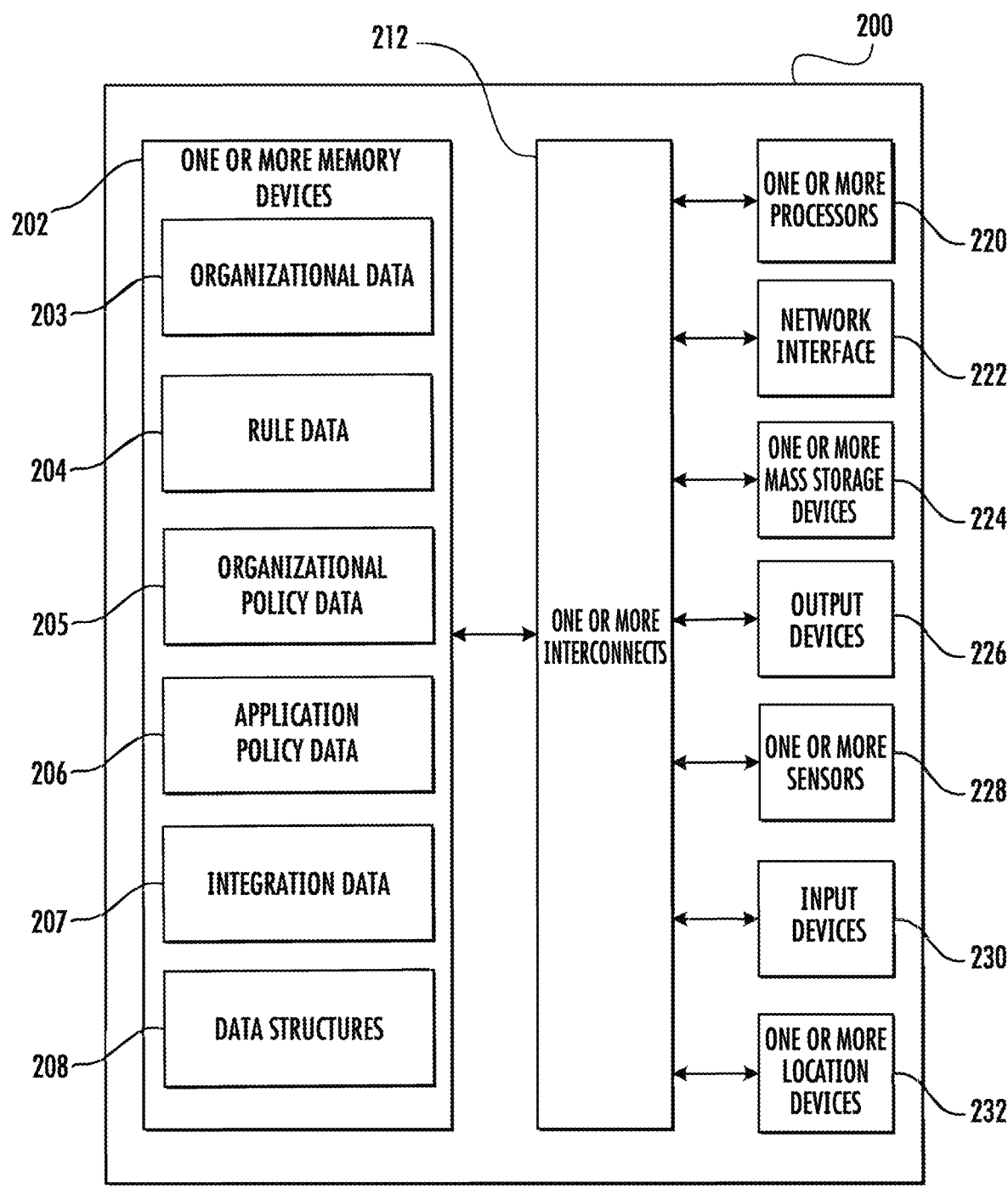
FIG. 2 depicts a block diagram of an example of a computing device, according to example embodiments of the present disclosure.

FIG. 2 depicts a block diagram of an example computing device 200 according to example embodiments of the present disclosure. The computing device 200 can include one or more attributes and/or capabilities of the computing system 110, the remote computing system 130, the one or more computing devices 152, and/or the computing device 200. Furthermore, the computing device 200 can be configured to perform one or more operations and/or one or more actions that can be performed by the computing system 110, the remote computing system 130, the one or more computing devices 152, and/or the computing device 200.

As shown in FIG. 2, the computing device 200 can include one or more memory devices 202, organizational data 203, rule data 204, machine-learned model 205, report configuration file data 206, integration data 207, data structures 208, one or more interconnects 212, one or more processors 220, a network interface 222, one or more mass storage devices 224, one or more output devices 226, one or more sensors 228, one or more input devices 230, and/or one or more location devices 232.

The one or more memory devices 202 can store information and/or data (e.g., organizational data 203, rule data 204, machine-learned model 205, report configuration file data 206, integration data 207, data structures 208, and/or any other types of data). Further, the one or more memory devices 202 can include one or more non-transitory computer-readable storage media, including RAM, ROM, EEPROM, EPROM, flash memory devices, magnetic disks, and any combination thereof. The information and/or data stored by the one or more memory devices 202 can be executed by the one or more processors 220 to cause the computing device 200 to perform one or more operations associated with generating a report.

The organizational data 203 can include one or more portions of data (e.g., the data 118, the data 138, and/or the data 158, which are depicted in FIG. 1) and/or instructions (e.g., the instructions 120, the instructions 140, and/or the instructions 160, which are depicted in FIG. 1) that are stored respectively in any of the one or more memory devices 116, 136, 156. The organizational data 203 also can include information associated with one or more applications (e.g., one or more third-party applications), one or more organizational records and/or one or more organizational policies. In some embodiments, the organizational data 203 can be received from one or more computing systems (e.g., the remote computing system 130 depicted in FIG. 1) which can include one or more computing systems that are remote (e.g., in another room, building, part of town, city, or nation) from the computing device 200.

The rule data 204 can include one or more portions of data (e.g., the data 118, the data 138, and/or the data 158, which are depicted in FIG. 1) and/or instructions (e.g., the instructions 120, the instructions 140, and/or the instructions 160, which are depicted in FIG. 1) that are stored in the one or more memory devices 116, the one or more memory devices 136, and/or the one or more memory devices 156, respectively. The rule data 204 can include information associated with one or more rules that can be used to generate a report, such as access rights to specific information in the organization data for a specific user. For example, salary information may be restricted to some users, and therefore a user request for salary information may be limited to information that access rights of that user. The rule data 204 also can include information associated with one or more rules of an organizational data management system (e.g., base or default rules provided or enforced by the system, one or more custom rules configured by an organization). In some embodiments, the rule data 204 can be received from one or more computing systems (e.g., the remote computing system 130 depicted in FIG. 1), which can include one or more computing systems that are remote from the computing device 200.

The machine-learned model(s) 205 can include or more machine-learned models. For example, a natural language processing model can process a user query and organization data (e.g., employee data objects) to generate a prompt. Additionally, a machine-learned model can process the prompt and the organizational data to generate a first report configuration file. The system can generate the report for the user query based on the first report configuration file. The machine-learned model(s) 205 can include one or more portions of data (e.g., the data 118, the data 138, and/or the data 158, which are depicted in FIG. 1) and/or instructions (e.g., the instructions 120, the instructions 140, and/or the instructions 160, which are depicted in FIG. 1) that are stored in the one or more memory devices 116, the one or more memory devices 136, and/or the one or more memory devices 156, respectively.

In some embodiments, the machine-learned model(s) can be stored in the remote computing system (e.g., the remote computing system 130 depicted in FIG. 1) which can include one or more computing systems that are remote from the computing device 200.

The report configuration file data 206 can include one or more portions of data (e.g., the data 118, the data 138, and/or the data 158, which are depicted in FIG. 1) and/or instructions (e.g., the instructions 120, the instructions 140, and/or the instructions 160, which are depicted in FIG. 1) that are stored in the one or more memory devices 116, the one or more memory devices 136, and/or the one or more memory devices 156, respectively. Furthermore, the report configuration file data 206 can include previously generated report configuration files by users of the organizational management platform. In some embodiments, the report configuration file data 206 can be received from one or more computing systems (e.g., the remote computing system 130 depicted in FIG. 1) which can include one or more computing systems that are remote from the computing device 200.

The integration data 207 can include one or more portions of data (e.g., the data 118, the data 138, and/or the data 158, which are depicted in FIG. 1) and/or instructions (e.g., the instructions 120, the instructions 140, and/or the instructions 160, which are depicted in FIG. 1) that are stored in the one or more memory devices 116, the one or more memory devices 136, and/or the one or more memory devices 156, respectively. The integration data 207 can include configuration and/or operational information associated with integrating and synchronizing data (e.g., organizational data 203) among one or more applications. For example, the integration data 207 can include information that enables integration and synchronization between each of one or more applications (e.g., third-party applications and/or other applications). In an embodiment, the integration data 207 provides integration information that allows an organizational data management system (e.g., a system of record for organizational data and organizational data processing), for example, to obtain information from one or more applications (e.g., third party and/or other applications), to perform operations involving organizational data (e.g., organizational data 203) in the organizational data management system, to synchronize organizational data across one or more applications, to perform one or more actions involving the applications based on organizational data in the organizational data management system, and/or to perform one or more other operations associated with managing organizational data as a system of record. In some embodiments, the integration data 207 can be received from one or more computing systems (e.g., the remote computing system 130 depicted in FIG. 1), which can include one or more computing systems that are remote from the computing device 200.

The data structures 208 can include one or more portions of data (e.g., the data 118, the data 138, and/or the data 158, which are depicted in FIG. 1) and/or instructions (e.g., the instructions 120, the instructions 140, and/or the instructions 160, which are depicted in FIG. 1) that are stored in the one or more memory devices 116, the one or more memory devices 136, and/or the one or more memory devices 156, respectively. The data structures 208 can include one or more logical and/or physical instances of information representing or describing one or more entities (e.g., objects, records, etc.), one or more relationships involving one or more of the entities, one or more data values associated with each of one or more of the entities and/or one or more of the relationships, one or more functions and/or operations that may be applied to each of one or more of the entities and/or one or more of the relationships, any other data or metadata describing or otherwise defining structure and/or rules associated with one or more of the entities and/or one or more of the relationships. The data structures 208 can be implemented and utilized with one or more types of computer software, computer hardware, or any combination thereof. In an embodiment, the data structures 208 are used to represent and perform processing associated with various types of organizational data (e.g., organizational data 203). For example, the data structures 208 may include information about various types of information and entities associated with organizational data including, but not limited to, individuals (e.g., employees, vendors, independent contractors), departments, teams, roles, groups, locations, offices, documents, tasks, reports, accounts, devices, applications, end-user applications, licenses, workflows, alerts, and/or any other types of entities representing or related to managing organizational data (e.g., organizational data 203).

The data structures 208 also can define various relationships among the various entities associated with organizational data. For example, the data structures 208 may define and be used to enforce relationships such as each employee must be assigned to a department, each employee can be included on one or more teams, each employee must be assigned to a primary location, each employee may be assigned to one or more secondary locations, employees may have one or more computing devices, each vendor must have a current audit, each independent contractor must be associated with a contract, and/or any other relationships provided by an organizational data management system or configured for an organization that utilizes an organizational data management system (e.g., a system for managing organizational data 203 based on one or more organizational data management applications).

In some embodiments, the data structures 208 can include one or more object graphs providing information about entities, relationships, and/or any other aspects relating to the definition, structure, and rules associated with organizational data (e.g., organizational data 203). The data structures 208 also can include any one or more other types of data structures (e.g., with or without the use of object graphs) that provide information about entities, relationships, and/or any other aspects of the definition, structure, and/or rules associated with organizational data. In some embodiments, the data structures 208 can be received from one or more computing systems (e.g., the remote computing system 130 depicted in FIG. 1), which can include one or more computing systems that are remote from the computing device 200.

The one or more interconnects 212 can include one or more interconnects or buses that can be used to send and/or receive one or more signals (e.g., electronic signals) and/or data (e.g., organizational data 203, rule data 204, machine-learned models 205, report configuration file data 206, integration data 207, data structures 208, and/or any other data) between components of the computing device 200, including the one or more memory devices 202, the one or more processors 220, the network interface 222, the one or more mass storage devices 224, the one or more output devices 226, the one or more sensors 228 (e.g., a sensor array), the one or more input devices 230, and/or the one or more location devices 232. The one or more interconnects 212 can be arranged or configured in different ways. For example, the one or more interconnects 212 can be configured as parallel or serial connections. Further the one or more interconnects 212 can include one or more internal buses that are used to connect the internal components of the computing device 200 and one or more external buses used to connect the internal components of the computing device 200 to one or more external devices. By way of example, the one or more interconnects 212 can include different interfaces including Industry Standard Architecture (ISA), Extended ISA, Peripheral Components Interconnect (PCI), PCI Express, Serial AT Attachment (SATA), HyperTransport (HT), USB (Universal Serial Bus), Thunderbolt, IEEE 1394 interface (Fire Wire), and/or other interfaces that can be used to connect components.

The one or more processors 220 can include one or more computer processors that are configured to execute the one or more instructions stored in the one or more memory devices 202. For example, the one or more processors 220 can, for example, include one or more general purpose central processing units (CPUs), application specific integrated circuits (ASICs), and/or one or more graphics processing units (GPUs). Further, the one or more processors 220 can perform one or more actions and/or operations including one or more actions and/or operations associated with the organizational data 203, the rule data 204, the machine-learned models 205, the report configuration file data 206, the integration data 207, the data structures 208, and/or any other data. The one or more processors 220 can include single or multiple core devices including a microprocessor, microcontroller, integrated circuit, and/or a logic device.

The network interface 222 can support network communications. The network interface 222 can support communication via networks including a local area network and/or a wide area network (e.g., the internet). For example, the network interface 222 can allow the computing device 200 to communicate with the computing system 110 via the network 102.

The one or more mass storage devices 224 (e.g., a hard disk drive and/or a solid-state drive) can be used to store data including the organizational data 203, the rule data 204, the machine-learned models 205, the report configuration file data 206, the integration data 207, the data structures 208, and/or any other data. The one or more output devices 226 can include one or more display devices (e.g., liquid crystal display (LCD), OLED display, mini-LED display, micro-LED display, plasma display, and/or cathode ray tube (CRT) display), one or more light sources (e.g., LEDs), one or more loudspeakers, and/or one or more haptic output devices (e.g., one or more devices that are configured to generate vibratory output).

The one or more sensors 228 can be configured to detect various states and can include one or more cameras, one or more light detection and ranging (LiDAR) devices, one or more sonar devices, and/or one or more radar devices. Further, the one or more sensors 228 can be used to provide input (e.g., an image of a user captured using the one or more cameras) that can be used as part of invoking or performing one or more operations. For example, the one or more sensors 228 can be used to authenticate the identity of a user and determine an authorization level based on an image of the user's face that is captured using the one or more sensors 228.

The one or more input devices 230 can include one or more touch sensitive devices (e.g., a touch screen display), a mouse, a stylus, one or more keyboards, one or more buttons (e.g., ON/OFF buttons and/or YES/NO buttons), one or more microphones, and/or one or more cameras (e.g., cameras that are used to detect gestures that can trigger one or more operations by the computing device 200).

Although the one or more memory devices 202 and the one or more mass storage devices 224 are depicted separately in FIG. 2, the one or more memory devices 202 and the one or more mass storage devices 224 can be regions within the same memory module. The computing device 200 can include one or more additional processors, memory devices, and/or network interfaces, which may be provided separately or on the same chip or board. The one or more memory devices 202 and the one or more mass storage devices 224 can include one or more computer-readable media, including, but not limited to, non-transitory computer-readable media, RAM, ROM, hard drives, flash drives, and/or other memory devices.

The one or more memory devices 202 can store sets of instructions for applications including an operating system that can be associated with various software applications or data. For example, the one or more memory devices 202 can store sets of instructions for one or more applications (e.g., one or more organizational applications and/or one or more third-party applications) that are subject to one or more application policies or utilize third-party integration data that can be configured, generated, and/or implemented by the computing device 200 and/or one or more other computing devices or one or more computing systems. In some embodiments, the one or more memory devices 202 can be used to operate or execute a general-purpose operating system that operates on mobile computing devices and/or and stationary devices, including for example, smartphones, laptop computing devices, tablet computing devices, and/or desktop computers.

The software applications that can be operated or executed by the computing device 200 can include applications associated with the computing system 110, the remote computing system 130, and/or the one or more computing devices 152 that are depicted in FIG. 1. Further, the software applications that can be operated and/or executed by the computing device 200 can include native applications, web services, and/or web-based applications.

The one or more location devices 232 can include one or more devices or circuitry for determining the position of the computing device 200. For example, the one or more location devices 232 can determine an actual and/or relative position of the computing device 200 by using a satellite navigation positioning system, a dead reckoning system, based on IP address, by using triangulation and/or proximity to cellular towers or Wi-Fi hotspots, and/or beacons.

Figure 3:
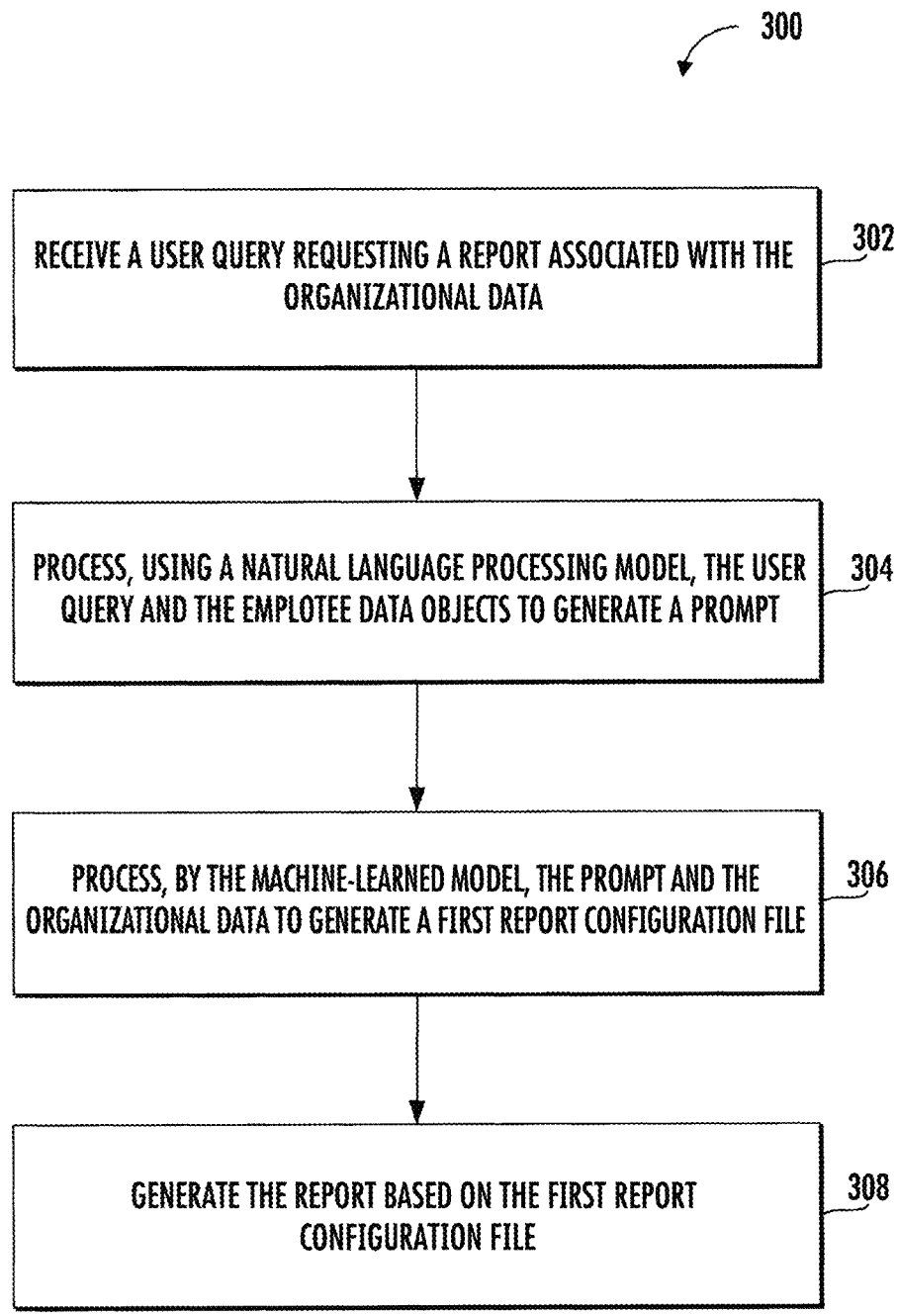
FIG. 3 depicts a flow chart diagram of an example method for automatically generating a report according to example embodiments of the present disclosure.

FIG. 3 depicts a flow diagram of an example method 300 for automatically generating reports, according to example embodiments of the present disclosure. One or more portions of the method 300 can be executed and/or implemented on one or more computing devices or computing systems including, for example, the computing system 110, the remote computing system 130, the one or more computing devices 152, the computing device 200. In addition, one or more portions of the method 300 can be executed or implemented as an algorithm on the hardware devices or systems disclosed herein. FIG. 3 depicts steps performed in a particular order for purposes of illustration and discussion. As such, those of ordinary skill in the art, using the disclosures provided herein, will understand that various steps of any of the methods disclosed herein can be adapted, modified, rearranged, omitted, and/or expanded without deviating from the scope of the present disclosure.

According to some embodiments, a computer system can automatically generate an output (e.g., report, chart) based on organizational data of an organization. The computer system can include one or more processors and one or more databases. The databases can collectively store the organizational data associated with the organization. The organizational data can include a plurality of employee data objects that respectively correspond to a plurality of employees of the organization and a plurality of previously generated report configuration files. Additionally, the databases can include a machine-learned model. The machine-learned model can be configured to generate a report configuration file based on a prompt. The machine-learned model can be trained using the plurality of previously generated report configuration files.

Figure 4:
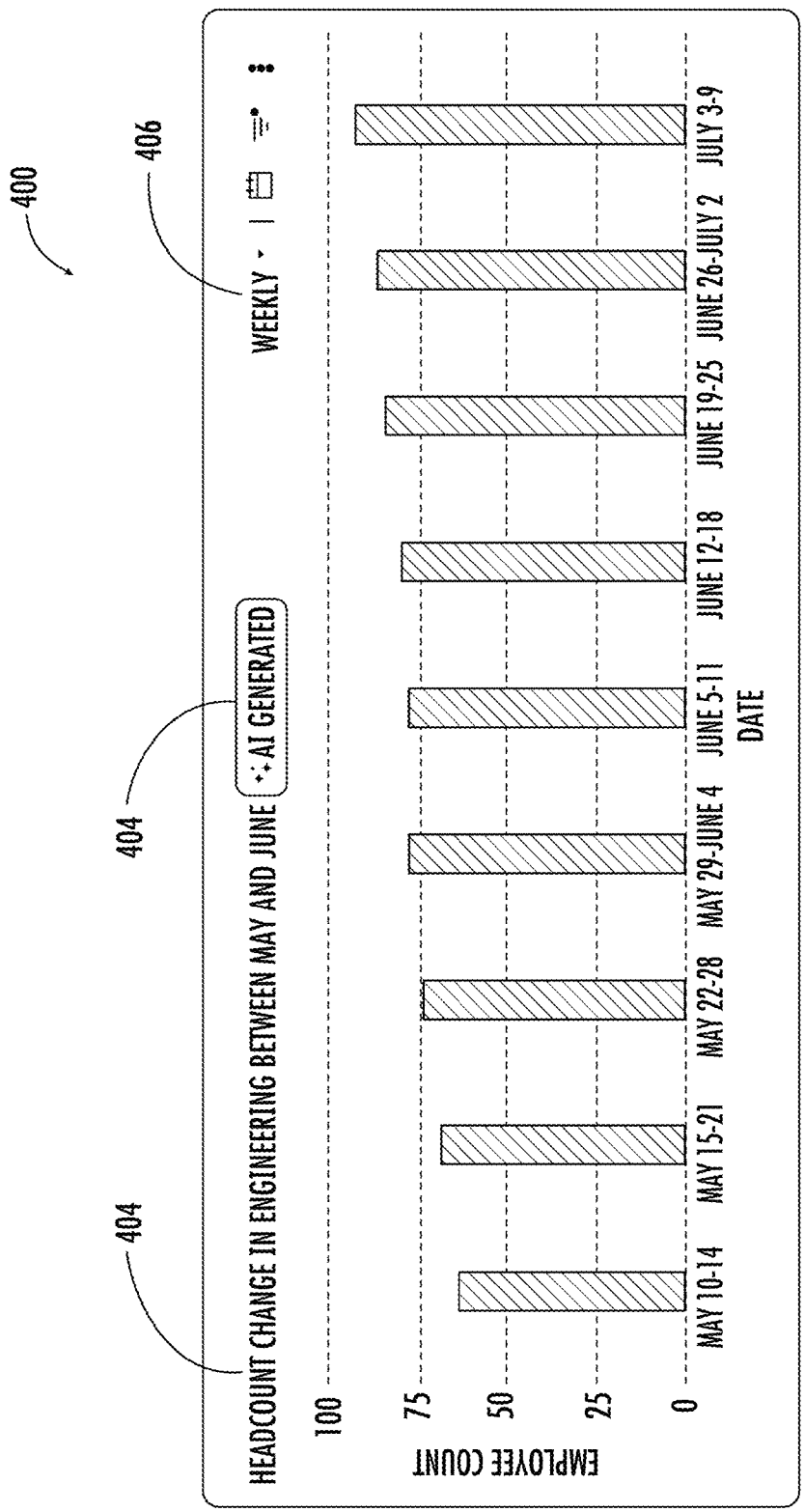
FIG. 4 illustrates an illustration of an AI-generated chart based on a user query according to example embodiments of the present disclosure.

At 302, a computer system can receive a user query requesting a report associated with the organizational data. For example, as illustrated in FIG. 4, the user query can request a report of "headcount change in engineering between May and June."

At 304, the computer system can process, using a natural language processing model, the user query and the employee data objects to generate a prompt. Continuing with the example in FIG. 4, the natural process model can generate a prompt to input into the machine-learned model (e.g., machine-learned model 205). The prompt can be generated based on the user query and the organizational data 203. The organizational data 204 can include employee data objects. The prompt can be "weekly headcount of employees in engineering."

At 306, the computer system can process, by the machine-learned model, the prompt and the organizational data to generate a first report configuration file. Continuing with the example in FIG. 4, the machine-learned model 205 can generate a first report configuration file based on the prompt. In some instances, the first report configuration file can be further based on the organizational data 203. For example, the organizational data can include employee graph objects that have an "engineering" department as one of the labels. The machine-learned model 205 can be trained by using previously generated report configuration files that were generated by users of the organization management platform across different organizations.

At 308, the computer system can generate the report based on the first report configuration file. As illustrated in the report 400 in FIG. 4, the system can generate a graph of employee count in the engineering department for the different weeks in May and June.

In some instances, the system can determine whether the first report configuration file is validated by comparing the first report configuration file with the plurality of previously generated report configuration files.

In some instances, the system can process the first report configuration file to generate the report when determined that the first report configuration file is validated.

In some instances, the system can determine that a parameter of the first report configuration file is incorrect based on the comparison of the first report configuration file with the plurality of previously generated report configuration files. Additionally, the system can update the parameter of the first report configuration file prior to the processing of the first report configuration file to generate the report.

In some instances, the system can select, from a plurality of template configuration files, a second report configuration file to generate the report when determined that the first report configuration is not validated.

In some instances, the plurality of template configuration files has been previously generated and stored in a database of the organizational management platform.

In some instances, the first report configuration file has a parameter that is associated with an attribute of the employee data objects.

In some instances, the report can be a chart. The system can determine the type of chart to generate based on the user query and/or report configuration file.

In some instances, the system can present the report on a graphical user interface. Additionally, the system can receive user feedback in response to the presentation of the report. Moreover, the system can update the first report configuration file based on the user feedback. Furthermore, the system can present an updated report on the graphical user interface, the updated report being generated based on the updated first report configuration file.

In some instances, the system can present the report on a graphical user interface. Additionally, the system can receive user feedback in response to the presentation of the report. Moreover, the system can update one or more parameters of the machine-learned model based on the user feedback.

FIG. 4 illustrates an illustration 400 of an AI-generated chart based on a user query according to example embodiments of the present disclosure. The graph can include a title 402, a label that the graph is "AI-generated" 404, and a user interface icon 406 to obtain user feedback. The user feedback can update the graph in real-time.

FIG. 5 illustrates an illustration 500 of an AI-generated table based on a user query according to example embodiments of the present disclosure. The illustration can include a text representation of the user query 502, an AI-generated table 504, and a user interface widget 506 that enables a user to keep the table or edit it further.

Figure 6:
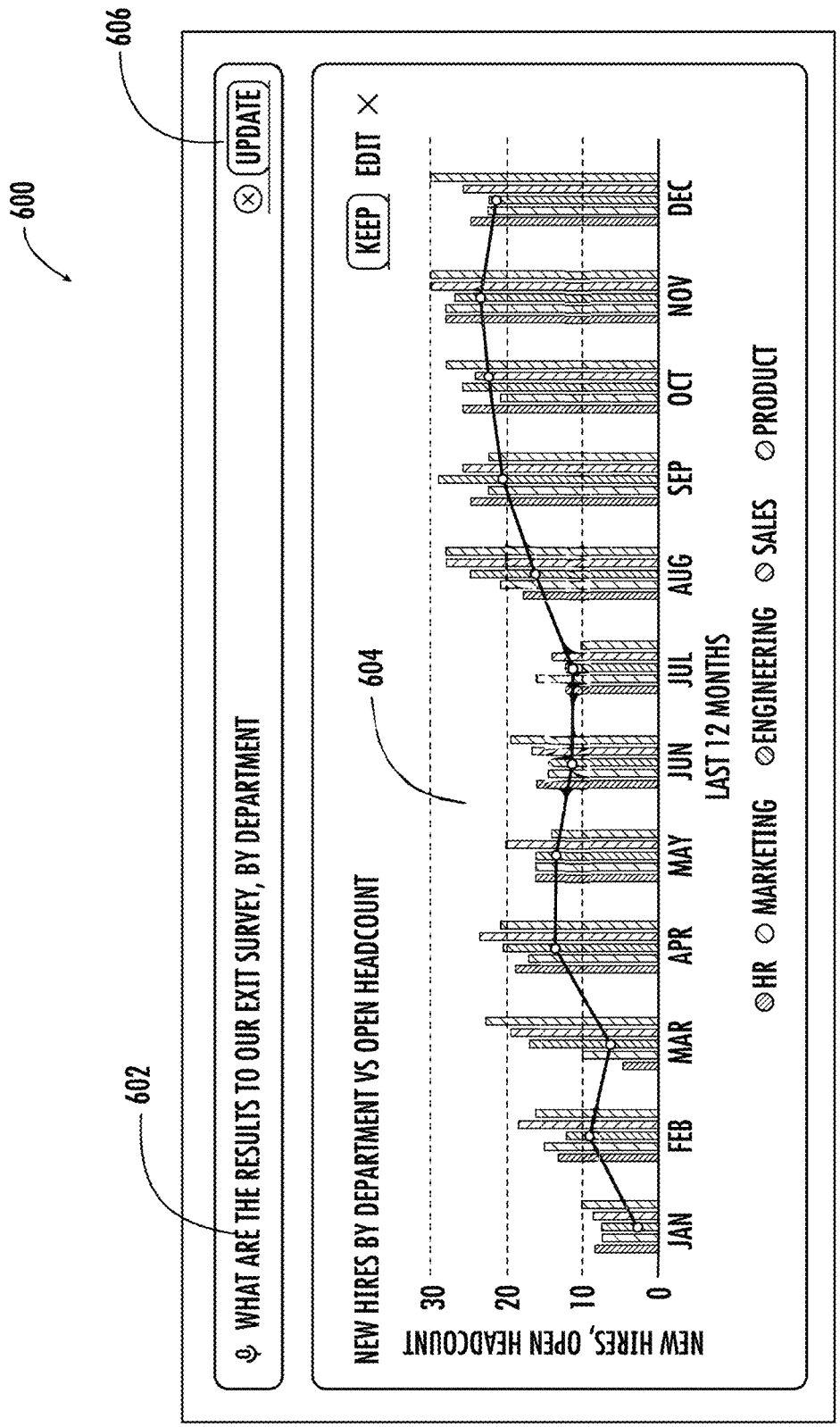
FIG. 6 illustrates an illustration of an AI-generated graph based on a user query according to example embodiments of the present disclosure.

FIG. 6 illustrates an illustration 600 of an AI-generated graph 604 based on a user query 602 according to example embodiments of the present disclosure. The illustration can include a text representation of the user query 602, an AI-generated graph 604, and a user interface widget 606 that enables a user to keep the table or edit it further.

Figure 7:
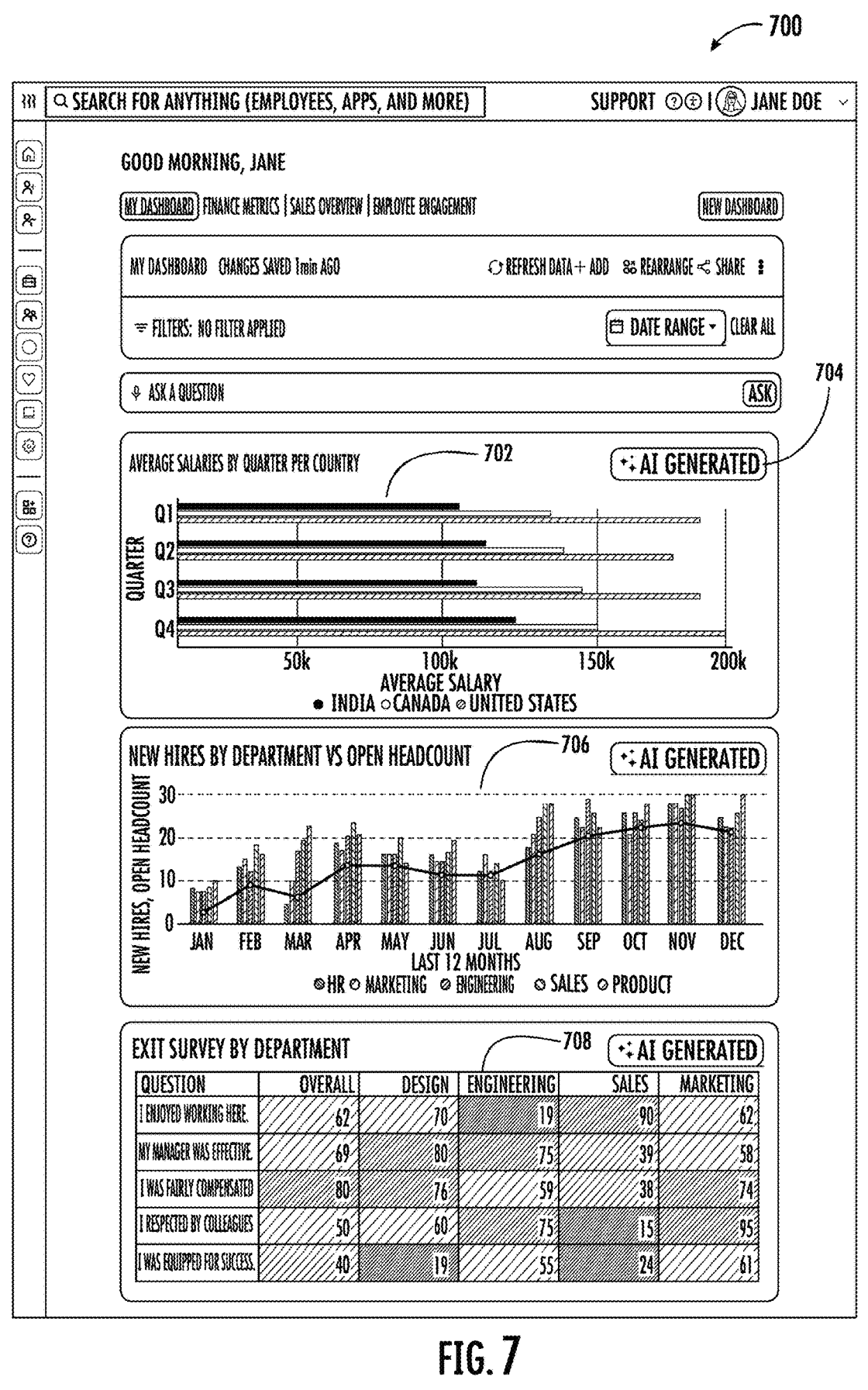

FIG. 7 illustrates an illustration 700 of a graphical user interface with a plurality of AI-generated reports 702, 706, and 708 according to example embodiments of the present disclosure. The report can include an "AI-generated" label 704 to indicate that the report was generated by a machine-learned model.

Numerous details are set forth in the foregoing description. However, it will be apparent to one of ordinary skills in the art having the benefit of this disclosure that the present disclosure may be practiced without these specific details. In some instances, structures and devices are shown in block diagram form, rather than in detail, to avoid obscuring the present disclosure.

Some portions of the detailed description have been presented in terms of processes and symbolic representations of operations on data bits within a computer memory. Here, a process can include a self-consistent sequence of steps leading to a result. The steps can include those requiring physical manipulations of physical quantities. These quantities can take the form of electrical or magnetic signals capable of being stored, transferred, combined, compared, and otherwise manipulated. These signals can be referred to as bits, values, elements, symbols, characters, terms, numbers, or the like.

These terms and similar terms can be associated with physical quantities and can represent labels applied to these quantities. The terms including "obtaining," "parsing," "analyzing," "accessing," "determining," "identifying," "adjusting," "modifying," "transmitting," "receiving," "processing" "generating," or the like, can refer to the actions and processes of a computer system, a computing device, or similar electronic computing device, that manipulates and transforms data represented as physical (e.g., electronic) quantities within the computer system's registers and memories into other data that can be similarly represented as physical quantities within the computer system's memories, registers, or other information storage device, data transmission device, or data processing device.

Certain examples of the present disclosure can relate to an apparatus for performing the operations described herein. This apparatus may include a computing device that is activated or reconfigured by a computer program comprising electronic instructions stored in the computing device. Such a computer program may be stored in a computer readable storage medium, which can include any type of storage. For example, the storage can include hard disk drives, solid state drives, floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions.

The above description is intended to be illustrative, and not restrictive. The scope of the disclosure can therefore be determined with reference to the claims.

The technology discussed herein makes reference to servers, databases, software applications, and other computer-based systems, as well as actions taken, and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure covers such alterations, variations, and equivalents.

What is claimed is:

1. A computer system that automatically generates an output based on organizational data of an organization, the computer system comprising:
   one or more processors; and
   one or more databases that collectively store the organizational data associated with the organization, wherein the organizational data comprising a plurality of employee data objects that respectively correspond to a plurality of employees of the organization, and a plurality of previously generated report configuration files; and
   a machine-learned model, wherein the machine-learned model is configured to generate a report configuration file based on a prompt, the machine-learned model being trained using the plurality of previously generated report configuration files;
one or more non-transitory computer-readable media that collectively store instructions that, when executed by the one or more processors, cause the computer system to perform operations, the operations comprising:
receiving a user query requesting a report associated with the organizational data;
processing, using a natural language processing model, the user query and the employee data objects to generate a prompt;
processing, by the machine-learned model, the prompt and the organizational data to generate a first report configuration file;
determining that a parameter of the first report configuration file is incorrect based on the comparison of the first report configuration file with the plurality of previously generated report configuration files;
updating the parameter of the first report configuration file prior to the processing of the first report configuration file to generate the report; and
generating the report based on the first report configuration file.

2. The system of claim 1, wherein the operations further comprise:
determining whether the first report configuration file is validated by comparing the first report configuration file with the plurality of previously generated report configuration files.

3. The system of claim 2, wherein the operations further comprise:
processing the first report configuration file to generate the report when determined that the first report configuration file is validated.

4. The system of claim 2, wherein the operations further comprise:
selecting, from a plurality of template configuration files, a second report configuration file to generate the report when determined that the first report configuration is not validated.

5. The system of claim 4, wherein the plurality of template configuration files has been previously generated and stored a database of the organizational management platform.

6. The system of claim 1, wherein the first report configuration file has a parameter that is associated with an attribute of the employee data objects.

7. The system of claim 1, wherein the report is a chart.

8. The system of claim 1, wherein the operations further comprise:
presenting the report on a graphical user interface;
receiving user feedback in response to the presentation of the report;
updating the first report configuration file based on the user feedback; and
presenting an updated report on the graphical user interface, the updated report being generated based on the updated first report configuration file.

9. The system of claim 1, wherein the operations further comprise:
presenting the report on a graphical user interface;
receiving user feedback in response to the presentation of the report; and
updating one or more parameters of the machine-learned model based on the user feedback.

10. A computer-implemented method, comprising:
storing organizational data associated with the organization, wherein the organizational data comprising a plurality of employee data objects that respectively correspond to a plurality of employees of an organization, and a plurality of previously generated report configuration files; and
accessing a machine-learned model, wherein the machine-learned model is configured to generate a report configuration file based on a prompt, the machine-learned model being trained using the plurality of previously generated report configuration files;
receiving a user query requesting a report associated with the organizational data;
processing, using a natural language processing model, the user query and the employee data objects to generate a prompt;
processing, by the machine-learned model, the prompt and the organizational data to generate a first report configuration file;
determining that a parameter of the first report configuration file is incorrect based on the comparison of the first report configuration file with the plurality of previously generated report configuration files;
updating the parameter of the first report configuration file prior to the processing of the first report configuration file to generate the report; and
generating the report based on the first report configuration file.

11. The method of claim 10, further comprising:
determining whether the first report configuration file is validated by comparing the first report configuration file with the plurality of previously generated report configuration files.

12. The method of claim 11, wherein the operations further comprise:
processing the first report configuration file to generate the report when determined that the first report configuration file is validated.

13. The method of claim 11, further comprising:
selecting, from a plurality of template configuration files, a second report configuration file to generate the report when determined that the first report configuration is not validated.

14. The method of claim 13, wherein the plurality of template configuration files has been previously generated and stored a database of the organizational management platform.

15. The method of claim 10, wherein the first report configuration file has a parameter that is associated with an attribute of the employee data objects.

16. The method of claim 10, further comprising:
presenting the report on a graphical user interface;
receiving user feedback in response to the presentation of the report;
updating the first report configuration file based on the user feedback; and
presenting an updated report on the graphical user interface, the updated report being generated based on the updated first report configuration file.

17. The method of claim 10, further comprising:
presenting the report on a graphical user interface;
receiving user feedback in response to the presentation of the report; and
updating one or more parameters of the machine-learned model based on the user feedback.

18. One or more tangible non-transitory computer-readable media storing computer-readable instructions that, when executed by one or more processors, cause the one or more processors to:

storing organizational data associated with the organization, wherein the organizational data comprising a plurality of employee data objects that respectively correspond to a plurality of employees of an organization, and a plurality of previously generated report configuration files; and accessing a machine-learned model, wherein the machine-learned model is configured to generate a report configuration file based on a prompt, the machine-learned model being trained using the plurality of previously generated report configuration files;

receiving a user query requesting a report associated with the organizational data;

processing, using a natural language processing model, the user query and the employee data objects to generate a prompt;

processing, by the machine-learned model, the prompt and the organizational data to generate a first report configuration file;

determining that a parameter of the first report configuration file is incorrect based on the comparison of the first report configuration file with the plurality of previously generated report configuration files;

updating the parameter of the first report configuration file prior to the processing of the first report configuration file to generate the report; and generating the report based on the first report configuration file.

* * * * *